United States Patent [19] [11] 4,269,768
Neeb et al. [45] May 26, 1981

[54] PROCESS FOR THE PREPARATION OF CHLOROZINCATE SALTS OF THIAZOLIUM AZO DYESTUFFS

[75] Inventors: Rudolf Neeb, Obertshausen; Kurt Hohmann, Neu-Isenburg; Reinhard Mohr, Offenbach am Main, all of Fed. Rep. of Germany

[73] Assignee: Hoechst Aktiengesellschaft, Fed. Rep. of Germany

[21] Appl. No.: 54,993

[22] Filed: Jul. 6, 1979

[30] Foreign Application Priority Data

Sep. 15, 1978 [DE] Fed. Rep. of Germany ....... 2840121

[51] Int. Cl.$^3$ .............................................. C09B 45/00
[52] U.S. Cl. ................................. 260/146 R; 260/157; 260/158
[58] Field of Search ................................... 260/146 R

[56] References Cited

U.S. PATENT DOCUMENTS

| | | | |
|---|---|---|---|
| 3,086,003 | 4/1963 | Baumann et al. | 260/146 R |
| 3,102,878 | 9/1963 | Baumann et al. | 260/146 R |
| 3,294,777 | 12/1966 | Hansen et al. | 260/157 |
| 3,707,532 | 12/1972 | Artz et al. | 260/158 |
| 4,018,756 | 4/1977 | Ohkawa et al. | 260/146 R |

FOREIGN PATENT DOCUMENTS 89775 8/1977 Poland .......................... 260/146 R UX Primary Examiner—Paul F. Shaver
Attorney, Agent, or Firm—Connolly and Hutz

[57] ABSTRACT

Chlorozincate salts of thiazolium azo compounds are prepared by reacting thiazolium azo compounds with an dialkylsulfate having from 1 to 4 carbon atoms in the alkyl radicals, which process comprises carrying out the reaction in an aqueous medium at a temperature of from about 10° to 50° C. in the presence of a zinc compound capable of binding acid, and with the use of from 1.8 to 2.5 mols of the dialkylsulfate, calculated on the starting azo dyestuff, at a pH not exceeding 8, preferably at 3–7. The prepared thiazolium azo compound is precipitated as chlorozincate salt, especially by means of an alkali metal chloride. According to this process, the chlorozincate salts are obtained in higher purity. A perceptible decomposition of the thiazolium azo compound does not occur. Chemicals, for example the alkylation agent and acid-binding agents need be used in a small quantity. In addition to this economy and to the less pollution of the waste water, the process has the advantage that it can be carried out with the use of a small reaction volume.

5 Claims, No Drawings

PROCESS FOR THE PREPARATION OF CHLOROZINCATE SALTS OF THIAZOLIUM AZO DYESTUFFS

The present invention relates to a simple and improved process for the preparation of chlorozincate salts of thiazolium azo dyestuffs in order to obtain them in a pure form.

It is known from German Offenlegungsschrift No. 1,943,799 to prepare benzothiazolium azo compounds by alkylation of benzothiazole-azo-p-aniline compounds by means of a dialkylsulfo ester in an aqueous medium and in the presence of a basic substance by adding the dialkylsulfo ester continuously to an aqueous alkaline dispersion of the azo dye in a total quantity of from 1 to 5 mols, preferably of from 3 to 5 mols, per mole of the feed azo dye. Owing to the fact that a considerable portion of the dialkylsulfate employed is hydrolyzed by the water serving as the reaction medium, there are alternatively used in the examples of said reference of from 4.3 to 5.1 mols of dialkylsulfate per mol of benzothiazole azo dye; consequently, a great excess of dialkylsulfate is required in any case in order to achieve a complete alkylation.

When performing the known process by using less than three mols of dialkylsulfate per mol of benzothiazole azo dye, the thin layer chromatography of the isolated quaternated benzothiazolium azo dye reveals a considerable content of unquaternated starting compound. When dyeing polyacrylonitrile fibers together with polyamide fibers as accompanying fibers with thus obtained dyes, the polyamide fibers are strongly dyed red shades. When transferring these process conditions to the preparation of thiazolium azo dyestuffs, corresponding impurities are formed.

These disadvantages are avoided by the novel process according to the invention for the preparation of chlorozincate salts of thiazolium azo dyes, in which the chlorozincate salt is obtained directly in pure form.

By the present process of the invention chlorozincate salts of thiazolium azo dyestuffs are prepared by reacting thiazole azo compounds with a dialkylsulfate having from 1 to 4 carbon atoms in each alkyl radical, preferably dimethylsulfate, in an aqueous medium at a temperature of approximately from 10° to 50° C., preferably from 20° to 40° C., in the presence of an acid acceptor and subsequently precipitating the alkylated product as chlorozincate salt, this process comprises alkylating with from 1.8 to 2.5 mols of the dialkylsulfate, calculated on the thiazole azo dyestuff, in the presence of a zinc compound capable of binding an acid, and at a pH suitably not exceeding 7.5, preferably not exceeding 7 and subsequently optionally precipitating the chlorozincate salt by adding an alkali metal chloride. Quaternization may be carried out in a pH range of from 7.5 to 0.5, preferably in a pH range of from 7 to 2.

Suitable acid-binding zinc compounds are especially zinc oxide, zinc carbonate, zinc hydroxide and zinc acetate, or mixtures thereof; zinc oxide is preferably used. As the alkali metal chloride there may be used potassium chloride or, especially, sodium chloride.

The process according to the invention relates particularly to the preparation of thiazolium azo compounds of the general formula (I)

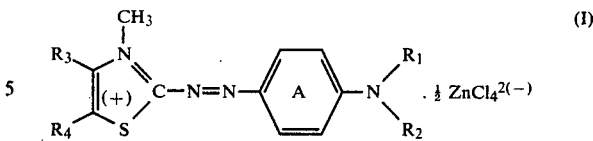

from thiazole azo compounds of the general formula (II)

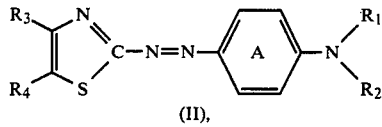

wherein the radicals are defined as follows:
$R_1$ represents a hydrogen atom, an alkyl group having from 1 to 4 carbon atoms which may be substituted by cyano, hydroxy, phthalimido or chlorine, or represents a benzyl, phenyl or naphthyl radical or alkenyl having from 2 to 5 carbon atoms which may be substituted by a halogen atom, for example a chlorine or bromine atom, $R_2$ represents a hydrogen atom, alkyl having from 1 to 4 carbon atoms which may be substituted by chlorine, cyano or hydroxy, or represents alkenyl having from 1 to 4 carbon atoms which may be substituted by a halogen atom, for example a chlorine or bromine atom, $R_1$ and $R_2$ being identical or different from each other, or $R_1$ and $R_2$ together with the nitrogen atom form a piperidine or morpholine ring, $R_3$ represents a hydrogen atom, alkyl having from 1 to 5 carbon atoms, a benzyl, phenyl or naphthyl radical, trifluoromethyl, cyano, the carboxylic acid group or the carboxylic acid benzyl ester group or a carboxylic acid alkyl ester group having from 1 to 5 carbon atoms in the alkyl radical, or represents the carboxylic acid amide or the carboxylic acid hydrazide group or a carbalkoxyalkylene group, the alkylene and alkoxy radical of which each having from 1 to 5 carbon atoms, or represents a carbamoylalkylene group, the alkylene radical thereof having from 1 to 5 carbon atoms, $R_4$ represents a hydrogen atom, alkyl having from 1 to 5 carbon atoms which may be substituted by hydroxy or cyano, or represents a phenyl or naphthyl radical, lower alkanoyl such as acetyl, the radial of an alkane carboxylic acid having from 1 to 5 carbon atoms in the alkyl group, the carboxylic acid or carboxylic acid benzyl ester group or a carboxylic acid alkyl ester group having from 1 to 5 carbon atoms in the alkyl radical, a carboxylic acid amide or carboxylic acid anilide radical, an alkylsulfonyl group having from 1 to 5 carbon atoms or a phenylsulfonyl radical, $R_1$, $R_2$, $R_3$ and $R_4$ being identical or different from each other, the benzene nucleus A may be substituted by 1 or 2 substituents selected from the group consisting of halogen, preferably chlorine, alkyl having from 1 to 4 carbon atoms, preferably methyl, and alkoxy having from 1 to 4 carbon atoms, preferably methoxy and ethoxy.

Preference is given to the manufacture of thiazolium azo dyestuffs of the formula I, wherein $R_1$ represents a hydrogen atom or alkyl having from 1 to 4 carbon atoms or represents a benzyl radical, $R_2$ represents alkyl having from 1 to 4 carbon atoms, β-cyanoethyl, β-hydroxyethyl or a benzyl radical, $R_3$ represents a hydrogen atom, alkyl having from 1 to 4 carbon atoms or a phenyl radical and $R_4$ represents a hydrogen atom or acetyl or carbalkoxy having from 1 to 4 carbon atoms in the alkyl group and wherein the benzene nucleus A may be substituted by chlorine, bromine, alkyl having from 1 to 4 carbon atoms, alkoxy having from 1 to 4 carbon atoms or carbalkoxy having from 1 to 4 carbon atoms in the alkyl group.

The zinc compounds used in the process according to the invention allow the reaction to be adjusted to a slightly acidic pH of from 3 to 7, preferably from 4 to 7, which is advantageous for the quaternization of thiazole azo compounds. Thiazole azo compounds are very weak bases, and their salts are hydrolyzed practically completely at pH 2; the free electron pair of the nitrogen atom in the thiazole ring is thus available for alkylation at this pH, so that reaction with dialkylsulfates can be carried out in the acid range, contrary to usual quaternizations of other azo dyes. Furthermore, the quaternized thiazolium azo dyes formed are very sensitive to higher pH values in aqueous solution; at a pH of from 9 to 10 for example, which is found in the case of an aqueous suspension of magnesium oxide, the thiazolium azo compound is gradually decomposed to form an insoluble residue. Therefore the quaternization in the acidic range generally yields products of better quality and a smaller quantity of residues.

On the other hand, however, hydrolysis of the dialkylsulfate, to yield alkylsulfuric acid and sulfuric acid, is far more pronounced in the strongly acid range than when operating in a slightly acid range, so that when working in the strongly acid range a large excess of the alkylation agent is required to compensate for the loss by hydrolysis. This large excess is not required for the process of the invention, in which the use of an acid-binding zinc compound makes it possible to maintain a slightly acid pH-range. Thus, when using, for example, zinc oxide as the acid acceptor according to the present invention, approximately 2.3 mols of dialkylsulfate per mol of thiazole azo compound is sufficient. The process of the present invention is advantageously started with the reaction mixture having a pH of approximately from 5 to 7.5, preferably from 6 to 7, and by the end of the reaction a pH of approximately from 0.5 to 1 may be reached. Advantageously the pH should not drop below 2 during the quaternization reaction.

A further advantage of the process of the invention is that, per mol of the starting thiazole azo compound, only approximately from 0.6 to 1 mol of zinc oxide or other acid-binding zinc compound is generally required for the alkylation reaction, this quantity of zinc compound being only a small excess with regard to the quantity required for separating the quaternary dyestuff as the chlorozincate salt.

It is essential for the industrial preparation of thiazolium azo dyestuffs, that, upon completion of the alkylation, even the smallest residues of the highly toxic dialkylsulfate (dimethylsulfate, for example, has a MAK value (the maximum concentration of a substance at a place of work) of 0.01 ppm) be destroyed in the reaction medium. This may be effected by heating the acid reaction mixture, while stirring, at a temperature of approximately from 60° to 80° C., until any residue of unreacted dialkylsulfate has been completely hydrolyzed. The desired thiazolium azo dyestuff which has been synthesized is not adversely affected by this process, since it is completely stable in a strongly acid medium, even near its boiling temperature. Consequently, the dialkylsulfate is advantageously destroyed at a pH below 2.

For obtaining the pure thiazolium azo compound a filtration is recommended which may be readily carried out upon destruction of the excess dialkylsulfate at elevated temperature. Upon clarification, the dyestuff may be precipitated in the form of the readily crystallizing tetrachlorozincate by the addition of a solid alkali metal chloride, thereafter filtered off and dried at a temperature of approximately 60° C. Since the precipitation agent, namely zinc chloride, is formed from the acid acceptor, for example zinc oxide, it does not have to be added separately. Thus the process of the invention has the further advantage that it has a relatively low consumption of chemicals and, consequently, the waste water is less polluted.

The process according to the invention, moreover, requires only a small reaction volume because of the low salt content of the dyestuff solution, since only a small quantity of acid-binding zinc compound need be used.

The following Examples illustrate the invention; parts and percentages are by weight.

EXAMPLE 1

58.3 g (0.2 mol) of the azo compound of the formula

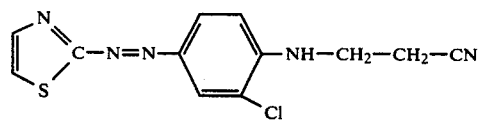

is heated to 30° C., while stirring, with 150 ml of water, 8.4 g (0.1 mol) of zinc oxide and 2.5 g of active carbon. 47.5 ml (0.499 mol) of dimethylsulfate are added to the resulting suspension all at once while vigorously stirring. During this reaction without cooling the reaction mixture attains a temperature from 45° to 50° C. Quaternization is then completed with further stirring for approximately 3 hours at 30° to 40° C. The pH value drops from about 6.5 to 7 to 0.7.

Next, the reaction mixture is successively diluted by adding 400 ml of water of about 70° C. and stirred for 2 hours at 60° to 70° C. in order to destroy the excess dimethylsulfate. The red-violet dyestuff solution formed is clarified and the thiazolium azo dyestuff obtained is precipitated from the filtrate at 60° C., while stirring, by adding portionwise 63 g of sodium chloride. The filtrate is stirred for 1 to 2 hours while cooling to 40° C. The dyestuff obtained in a crystalline form is suction-filtered at approximately 40° C. and washed portionwise with 125 ml of an aqueous 5% by weight sodium chloride solution and dried at 60° C.

79 g of the dyestuff of the formula

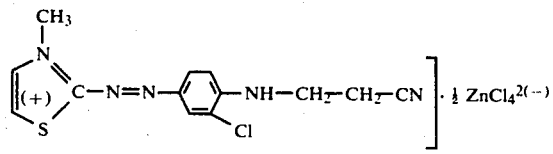

are obtained.

When applying this dyestuff to polyacrylonitrile fibers according to conventional dyeing methods, red-violet shades having very good fastness properties are obtained.

EXAMPLE 2

23 g (0.1 mol) of the azo compound of the formula

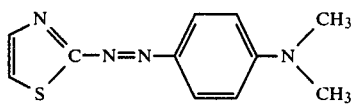

and 4.2 g (0.052 mol) of zinc oxide are suspended in 75 ml of water. The pH value is in the range from 5.6 to 6.8. Without cooling 17 ml (0.18 mol) of dimethylsulfate are added all at once at 40° C., whereby the temperature rises to 40° to 45° C. Quaternization is completed after a one hour's stirring at 30° to 40° C. Next, 150 ml of water of about 70° to 80° C. are added and the excess dimethylsulfate is destroyed by stirring at a temperature from 70° to 80° C. for 2 hours. The pH value drops below 1. The resulting violet dyestuff solution is filtered at approximately 70° C. and the reaction vessel is rinsed with approximately from 100 to 150 ml of water, which water after filtration, is combined with the other filtrate. The total filtrate is supplemented at 40° to 50° C. with 50 g of sodium chloride, the dyestuff precipitating in crystalline form is suction-filtered and washed portionwise with 50 ml of a 5% aqueous sodium chloride solution, and dried at 60° C.

30 g of the dyestuff of the formula

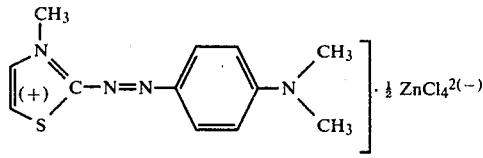

are obtained.

Violet dyeings on polyacrylonitrile fibers having very good fastness properties are obtained according to conventional dyeing methods.

EXAMPLE 3

61.5 g (0.2 mol) of the dyestuff of the formula

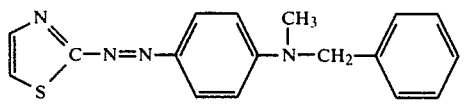

and 8.4 g (0.1 mol) of zinc oxide are suspended in 150 ml of water. The pH value is in the range from 5.6 to 6.5. While cooling, 43.8 ml (0.46 mol) of dimethylsulfate are added dropwise at 40° C. within 5 minutes, the temperature rising thereafter to 45° to 50° C. Quaternization is completed by further stirring for 2 hours at 30° to 40° C., and for 1 hour at 50° to 60° C. Then 1500 ml of water of 70° to 80° C. are added and stirring is continued for 2 hours at 70° to 80° C. in order to destroy possibly still existing dimethylsulfate. During stirring the pH value drops to 0.5. Then 1 g of kieselguhr is added by stirring, the dyestuff solution is suction-filtered and washed with 200 ml of water having a temperature from approximately 70° to 80° C.

The filtrate is then added dropwise to a recipient containing 300 g of sodium chloride in 500 ml of water having a temperature from 25° to 30° C., in the course of which the quaternized azo dyestuff precipitates. It is suction-filtered and dried at 40° to 50° C. 82 g of the dyestuff of the formula

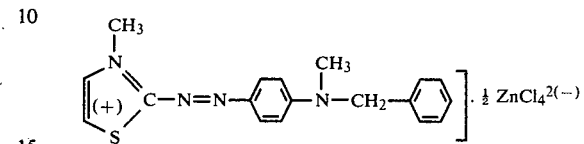

are obtained which may be applied to polyacrylonitrile fibers according to conventional dyeing methods; dyeings of a violet shade having very good fastness properties to water and to light, are obtained.

EXAMPLES 1a to 3a

When using in any of the Examples 1 to 3, instead of zinc oxide, the equivalent quantity of zinc carbonate or zinc hydroxide as acid-binding agent, the thiazolium azo dyestuffs are obtained in the same good yield and in a high purity.

EXAMPLES 4 to 126

When proceeding in analogous manner as in any of the above Examples 1 to 3 or 1a to 3a, except that instead of the starting azo compounds used in these Examples there are employed the equivalent quantities of one of the starting azo compounds (shown in the form of their diazo and coupling components) listed in the following Tables, and methylating them in the indicated manner, the corresponding thiazolium azo compounds N-methylated in the thiazole nucleus, are obtained in the form of their tetrachlorozincates. On polyacrylonitrile fiber materials dyeings of the shades listed in the Table with good tinctorial properties and fastness properties are obtained.

| | Starting azo dyestuff | | Shade |
|---|---|---|---|
| Ex. | Diazo Component | Coupling component | on the PAC fiber |
| 4 | 2-amino-thiazole | N,N-diethyl-aniline | violet |
| 5 | 2-amino-thiazole | N,N-di-n-butyl-aniline | violet |
| 6 | 2-amino-thiazole | 3-methyl-N,N-dimethyl-aniline | violet |
| 7 | 2-amino-thiazole | 3-methyl-N,N-diethyl-aniline | violet |
| 8 | 2-amino-thiazole | 3-chloro-N,N-dimethyl-aniline | violet |
| 9 | 2-amino-thiazole | 3-chloro-N,N-diethyl-aniline | violet |
| 10 | 2-amino-thiazole | 3-carbomethoxy-N,N-dimethyl-aniline | reddish-blue |
| 11 | 2-amino-thiazole | 3-carbomethoxy-N,N-diethyl-aniline | reddish-blue |
| 12 | 2-amino-thiazole | 3-(N',N'-diethyl-carbonamido)-N,N-dimethyl-aniline | violet |
| 13 | 2-amino-thiazole | 3-N',N'-diethyl-carbonamido-N,N-diethyl-aniline | violet |
| 14 | 2-amino-thiazole | 3-N',N'-diethyl-sulfonamido-N,N-diethyl-aniline | violet |
| 15 | 2-amino-thiazole | 3-acetylamino-N,N-diethyl-aniline | reddish-blue |
| 16 | 2-amino-thiazole | N-benzyl-N-ethyl-aniline | violet |
| 17 | 2-amino- | N-benzyl-N-n-butyl-aniline | violet |

-continued

| Ex. | Starting azo dyestuff Diazo Component | Coupling component | Shade on the PAC fiber |
|---|---|---|---|
| 18 | 2-amino-thiazole | 3-methyl-N-benzyl-N-ethyl-aniline | violet |
| 19 | 2-amino-thiazole | N-($\beta$-phenethyl)-N-ethyl-aniline | violet |
| 20 | 2-amino-thiazole | N,N-di-($\beta$-hydroxyethyl)-aniline | violet |
| 21 | 2-amino-thiazole | N-[$\beta$-(p-nitro-phenoxy)-ethyl]-N-ethyl-aniline | violet |
| 22 | 2-amino-thiazole | N,N-dibenzyl-aniline | violet |
| 23 | 2-amino-thiazole | 3-methyl-N,N-di-($\beta$-acetoxy-ethyl)-aniline | violet |
| 24 | 2-amino-thiazole | 3-trifluoromethyl-N-($\beta$-carboethoxy-ethyl)-aniline | violet |
| 25 | 2-amino-thiazole | diphenylamine | violet |
| 26 | 2-amino-thiazole | N-ethyl-diphenylamine | violet |
| 27 | 2-amino-thiazole | N-cyclohexyl-N-methyl-aniline | violet |
| 28 | 4-methyl-2-amino-thiazole | 2-chloro-N-($\beta$-cyanoethyl)-aniline | red-violet |
| 29 | 4-methyl-5-acetyl-2-amino-thiazole | 2-carbethoxy-N-($\beta$-cyano-ethyl)-aniline | red-violet |
| 30 | 4-phenyl-5-carbo-methoxy-2-amino-thiazole | 2-bromo-N-carbethoxymethyl-aniline | red-violet |
| 31 | 4-methyl-5-carbethoxy-2-amino-thiazole | 2-chloro-N-($\beta$-carboethoxy-ethyl)-aniline | red-violet |
| 32 | 4-phenyl-2-amino-thiazole | 2-carbomethoxy-N-($\beta$-carbomethoxy-ethyl)-aniline | red-violet |
| 33 | 2-amino-thiazole-4-acetic acid methyl ester | 2-chloro-N-($\beta$-cyanoethyl)-aniline | red-violet |
| 34 | 2-amino-thiazole | 2-fluoro-N-($\beta$-cyanoethyl)-aniline | red-violet |
| 35 | 2-amino-thiazole | 2-phenoxy-aniline | red-violet |
| 36 | 2-amino-thiazole | 2-chloro-N-($\beta$-hydroxyethyl)-aniline | red-violet |
| 37 | 2-amino-thiazole | 2-chloro-N-($\beta$-carbomethoxy-ethyl)-aniline | red-violet |
| 38 | 2-amino-thiazole | 2-chloro-N-carbomethoxy-methyl-aniline | red-violet |
| 39 | 2-amino-thiazole | 2-chloro-N-ethyl-aniline | red-violet |
| 40 | 2-amino-thiazole | 2-bromo-N-($\beta$-cyanoethyl)-aniline | red-violet |
| 41 | 2-amino-thiazole | 2-methyl-N-($\beta$-cyanoethyl)-aniline | red-violet |
| 42 | 2-amino-thiazole | N-($\beta$-phenethyl)-N-($\beta$-cyano-ethyl)-aniline | red-violet |
| 43 | 2-amino-thiazole | 3-chloro-N-methyl-N-($\beta$-cyanoethyl)-aniline | red-violet |
| 44 | 2-amino-thiazole | 2-carbomethoxy-N-($\beta$-cyano-ethyl)-aniline | red-violet |
| 45 | 2-amino-thiazole | 2,5-dimethyl-aniline | red-violet |
| 46 | 2-amino-thiazole | 2-chloro-5-methyl-aniline | red-violet |
| 47 | 2-amino-thiazole | 3-chloro-6-methyl-aniline | red-violet |
| 48 | 2-amino-thiazole | 3-trifluoromethyl-N,N-diethyl-aniline | violet |
| 49 | 2-amino-thiazole | N-methyl-N-($\beta$-cyanoethyl)-aniline | violet |
| 50 | 2-amino-thiazole | N-methyl-N-(carbomethoxy-methyl)-aniline | violet |
| 51 | 2-amino-thiazole | N-ethyl-N-($\beta$-hydroxyethyl)-aniline | violet |
| 52 | 2-amino-thiazole | N-ethyl-N-($\beta$-methoxy-ethyl)-aniline | violet |
| 53 | 2-amino-thiazole | N-ethyl-N-($\beta$-carbomethoxy-ethyl)-aniline | violet |
| 54 | 2-amino-thiazole | N-ethyl-N-($\gamma$-chloro-$\beta$-hydroxy-propyl)-aniline | violet |
| 55 | 2-amino-thiazole | 3-methyl-N-ethyl-N-($\beta$-chloroethyl)-aniline | violet |
| 56 | 2-amino-thiazole | 3-methyl-N-ethyl-[N',N'-diethylcarbamoyl)-methyl]-aniline | violet |
| 57 | 2-amino-thiazole | N-n-butyl-N-($\beta$-cyano-ethyl)-aniline | violet |
| 58 | 2-amino-thiazole | N-ethyl-N-($\beta$-carbamoyl-ethyl)-aniline | violet |
| 59 | 2-amino-thiazole | N-$\beta$-cyanoethyl-aniline | violet |
| 60 | 2-amino-thiazole | N-($\beta$-hydroxyethyl)-N-($\beta$-cyanoethyl)-aniline | violet |
| 61 | 2-amino-thiazole | 2-methoxy-N,N-diethyl-aniline | reddish-blue |
| 62 | 2-amino-thiazole | 3-cyano-N,N-dimethyl-aniline | reddish-blue |
| 63 | 4-methyl-5-carbo-methoxy-2-amino-thiazole | 2-methoxy-N,N-dimethyl-aniline | reddish-blue |
| 64 | 2-amino-thiazole | 3-hydroxy-N,N-diethyl-aniline | violet |
| 65 | 2-amino-thiazole | 3-methoxy-N,N-dimethyl-aniline | violet |
| 66 | 2-amino-thiazole | 3-acetyloxy-N,N-diethyl-aniline | dull red |
| 67 | 2-amino-thiazole | N-ethyl-N-($\beta$-phenoxyethyl)-aniline | violet |
| 68 | 2-amino-thiazole | N-methyl-N-($\beta$-carboxyethyl)-aniline | violet |
| 69 | 2-amino-thiazole | 2-methoxy-N-($\alpha,\beta$-dicarbo-methoxyethyl)-aniline | violet |
| 70 | 2-amino-thiazole | N-(cyanoethyl)-N-[$\beta$-(methyl-amino-carbonyloxy)-ethyl]-aniline | violet |
| 71 | 2-amino-thiazole | 2-methyoxy-N-benzyl-aniline | reddish-blue |
| 72 | 2-amino-thiazole | 2-methoxy-aniline | reddish-blue |
| 73 | 2-amino-thiazole | 2-hydroxy-N-($\beta$-cyanoethyl)-aniline | dull reddish-blue |
| 74 | 2-amino-thiazole | N-($\beta$-cyanoethyl)-5-hydroxy-1,2,3,4-tetrahydroquinoline | violet |
| 75 | 2-amino-thiazole | 2-carbomethoxy-aniline | dark red |
| 76 | 2-amino-thiazole | N-[propen(1)-3-yl]-N-($\beta$-cyanoethyl)-aniline | violet |
| 77 | 2-amino-thiazole | 3-hydroxy-aniline | dark red |
| 78 | 4-methyl-5-carbo-ethoxy-2-amino-thiazole | N,N-dimethyl-aniline | violet |
| 79 | 4-methyl-5-carbo-ethoxy-2-amino-thiazole | N-($\beta$-cyanoethyl)-N-($\beta$-phenethyl)-aniline | violet |
| 80 | 4-methyl-5-carbo-ethoxy-2-amino-thiazole | 3-methyl-N-ethyl-N-($\beta$-carbomethoxy-ethyl)-aniline | violet |
| 81 | 4-methyl-5-carbo- | N-ethyl-N-benzyl-aniline | violet |

-continued

| Ex. | Starting azo dyestuff Diazo Component | Coupling component | Shade on the PAC fiber |
|---|---|---|---|
| | ethoxy-2-aminothiazole | | |
| 82 | 4-methyl-5-carboethoxy-2-aminothiazole | 3-methyl-N-ethyl-N-(β-phenoxysulfonyl-ethyl)-aniline | violet |
| 83 | 4-methyl-5-carboethoxy-2-aminothiazole | N-n-butyl-N-(β-chloroethyl)-aniline | violet |
| 84 | 4-phenyl-5-carboethoxy-2-aminothiazole | 3-methyl-N,N-dimethyl-aniline | violet |
| 85 | 4-phenyl-5-carboethoxy-2-aminothiazole | N,N-di-n-butyl-aniline | violet |
| 86 | 4-phenyl-5-carboethoxy-2-aminothiazole | N-methyl-N-benzyl-aniline | violet |
| 87 | 4-methyl-5-carbomethoxy-2-aminothiazole | N,N-di-n-butyl-aniline | violet |
| 88 | 4-methyl-5-carbomethoxy-2-aminothiazole | 3-methyl-N,N-diethyl-aniline | violet |
| 89 | 4-methyl-5-carbomethoxy-2-aminothiazole | 3-methyl-N-ethyl-N-benzyl-aniline | violet |
| 90 | 4-methyl-5-carbomethoxy-2-aminothiazole | N-n-butyl-N-(β-carbomethoxy)-ethyl)-aniline | violet |
| 91 | 4-methyl-5-carbomethoxy-2-aminothiazole | N,N-dibenzyl-aniline | violet |
| 92 | 4-methyl-5-(β-cyanoethyl)-2-aminothiazole | N-methyl-N-benzyl-aniline | reddish-blue |
| 93 | 4-methyl-5-(β-cyanoethyl)-2-aminothiazole | 3-methyl-N-N-diethyl-aniline | reddish-blue |
| 94 | 4-methyl-5-(β-cyanoethyl)-2-aminothiazole | 3-methyl-N-ethyl-N-(β-cyanoethyl)-aniline | reddish-blue |
| 95 | 4-methyl-5-(β-cyanoethyl)-2-aminothiazole | N,N-di-n-butyl-aniline | reddish-blue |
| 96 | 4-methyl- | N-ethyl-N-benzyl-aniline | reddish- |
| | 2-aminothiazole 5-carboxylic acid anilide | | blue |
| 97 | 4-methyl-2-aminothiazole 5-carboxylic acid anilide | 3-methyl-N,N-diethyl-aniline | reddish-blue |
| 98 | 4-methyl-2-aminothiazole 5-carboxylic acid anilide | N-n-butyl-N-(β-cyanoethyl)-aniline | reddish-blue |
| 99 | 2-aminothiazole | N-(3-methylphenyl)-morpholine | violet |
| 100 | 2-aminothiazole | N-methyl-N-(α,β-dicarbomethoxy-ethyl)-aniline | violet |
| 101 | 2-aminothiazole | N-ethyl-N-(β,γ-dichloropropyl)-aniline | violet |
| 102 | 2-aminothiazole | 3-methyl-N-ethyl-N-[β-N'-methyl-N'-phenyl-sulfamoyl)-ethyl]-aniline | violet |
| 103 | 2-aminothiazole | 3-chloro-N,N-di-(β-chloroethyl)-aniline | violet |
| 104 | 2-aminothiazole | N-ethyl-N-[β-(β'-cyanoethoxy)-ethyl]-aniline | violet |
| 105 | 2-aminothiazole | N-ethyl-N-(β-phenoxysulfonyl-ethyl)-aniline | violet |
| 106 | 2-aminothiazole | N-methyl-N-(2-bromopropen(1)-3-yl)-aniline | violet |
| 107 | 2-aminothiazole | N-ethyl-N-(2-methylpropen(1)-3-yl)-aniline | violet |
| 108 | 2-aminothiazole | 3-methyl-N-ethyl-N-propen(3')-yl-aniline | violet |
| 109 | 2-aminothiazole | N-ethyl-N-(β-benzoyloxyethyl)-aniline | violet |
| 110 | 2-aminothiazole 4-acetic acid ethyl ester | N-(3-chlorophenyl)-morpholine | violet |
| 111 | 4-phenyl-2-aminothiazole | 3-methyl-N-ethyl-N-(β-cyanoethyl)-aniline | violet |
| 112 | 4-methyl-2-aminothiazole | N,N-dibenzyl-aniline | violet |
| 113 | 4-methyl-2-aminothiazole | 3-methyl-N-ethyl-(β-cyanoethyl)-aniline | violet |
| 114 | 4-methyl-5-acetyl-2-aminothiazole | 3-methyl-N,N-diethyl-aniline | violet |
| 115 | 4-methyl-5-acetyl-2-aminothiazole | N-methyl-N-benzyl-aniline | violet |
| 116 | 4-methyl-5-acetyl-2-aminothiazole | N,N-diethyl-aniline | violet |
| 117 | 4-methyl-5-acetyl-2-aminothiazole | N-n-butyl-N-(β-carboethoxy-ethyl)-aniline | violet |
| 118 | 4-methyl-5-acetyl-2-aminothiazole | N,N-di-n-butyl-aniline | violet |
| 119 | 4-methyl- | N,N-dibenzyl-aniline | violet |

-continued

| Ex. | Starting azo dyestuff Diazo Component | Coupling component | Shade on the PAC fiber |
|---|---|---|---|
| | 5-acetyl-2-amino-thiazole | | |
| 120 | 2-amino-thiazole | 1,3-diphenyl-5-amino-pyrazole | orange |
| 121 | 2-amino-thiazole | 1-phenyl-3-hydroxy-5-aminopyrazole | gold colored |
| 122 | 2-amino-thiazole | 1,2-dimethyl-indole | orange |
| 123 | 2-amino-thiazole | 1-methyl-2-phenyl-indole | red |
| 124 | 2-amino-thiazole | 1-methyl-5-amino-pyrazole | orange |
| 125 | 2-amino-thiazole | 1-phenyl-5-amino-pyrazole | orange |
| 126 | 2-amino-thiazole | 1-phenyl-2-methyl-indole | red |

EXAMPLES 127 to 131

When processing in analogous manner as in any of the above Examples 1 to 3 or 1a to 3a, except that instead of the starting azo compound used therein, there are employed the equivalent quantities of one of the starting disazo compounds listed in the following Table (shown in the form of their diazo and coupling components and prepared by coupling twice 2 mols of the diazo compound to 1 mol of the coupling component), and dismethylating the starting disazo compound in analogous manner, but with the use of twice the quantity of dimethylsulfate and of the acid-binding zinc compond, there are obtained the corresponding bis-thiazolium disazo dyestuffs in the form of their tetra-chlorozincates each time N-methylated at the thiazole nucleus. These dyestuffs dye polyacrylonitrile fibers, with good coloring properties yielding dyeings of good fastness properties and the shades listed in the Table.

| Ex. | Starting azo dyestuff Diazo Component | Coupling component | Shade on the PAC fiber |
|---|---|---|---|
| 127 | 2-amino-thiazole | 1,2-[di-(N-ethyl-anilino)]-ethane | reddish-blue |
| 128 | 2-amino-thiazole | 1,2-[di-(N-ethyl-3'-methyl-anilino)]-ethane | reddish-blue |
| 129 | 2-amino-thiazole | 2,2'-[di-(N-ethyl-aniline)]-diethyl ether | reddish-blue |
| 130 | 2-amino-thiazole | 1,3-[di-(N-methyl-aniline)]-propane | reddish-blue |
| 131 | 2-amino-thiazole | 1-(N-ethyl-anilino)-2-(N-methyl-anilino)-ethane | reddish-blue |

What is claimed is:

1. In a process for the manufacture of a chlorozincate salt of a thiazolium azo dyestuff which comprises treating a thiazole azo compound with a dialkylsulfate having from 1 to 4 carbon atoms in each alkyl moiety in an aqueous medium at a temperature of approximately from 10° to 50° C. and at a pH between 7 and 3 in the presence of an acid-binding zinc compound, and subsequently precipitating the alkylated product as chlorozincate salt, the improvement consisting of: (1) carrying out the alkylation with the use of from 1.8 to 2.5 mols of the dialkylsulfate, calculated on the thiazole azo compound and (2) precipitating the thiazolium azo dyestuff formed from the reaction solution as the chlorozincate salt by adding an alkali metal chloride.

2. The process as claimed in claim 1, which comprises using as a zinc compound zinc oxide, zinc carbonate, zinc hydroxide or zinc acetate.

3. The process as claimed in anyone of claims 1 or 2, which comprises using from 0.6 to 1.0 mol of the zinc compound per mol of the thiazole azo dyestuff.

4. The process as claimed in anyone of claims 1 or 2, wherein, after the quaternization reaction, the reaction mixture is heated at a pH below 2 and at a temperature of from approximately 60° to 80° C.

5. The process as claimed in claim 4, wherein the hot resulting dyestuff solution after hydrolysis of the dialkylsulfate, is clarified by filtration.

* * * * *